N. ANDERSON.
CLUTCH LOCK.
APPLICATION FILED APR. 17, 1920.
1,383,278.
Patented July 5, 1921.
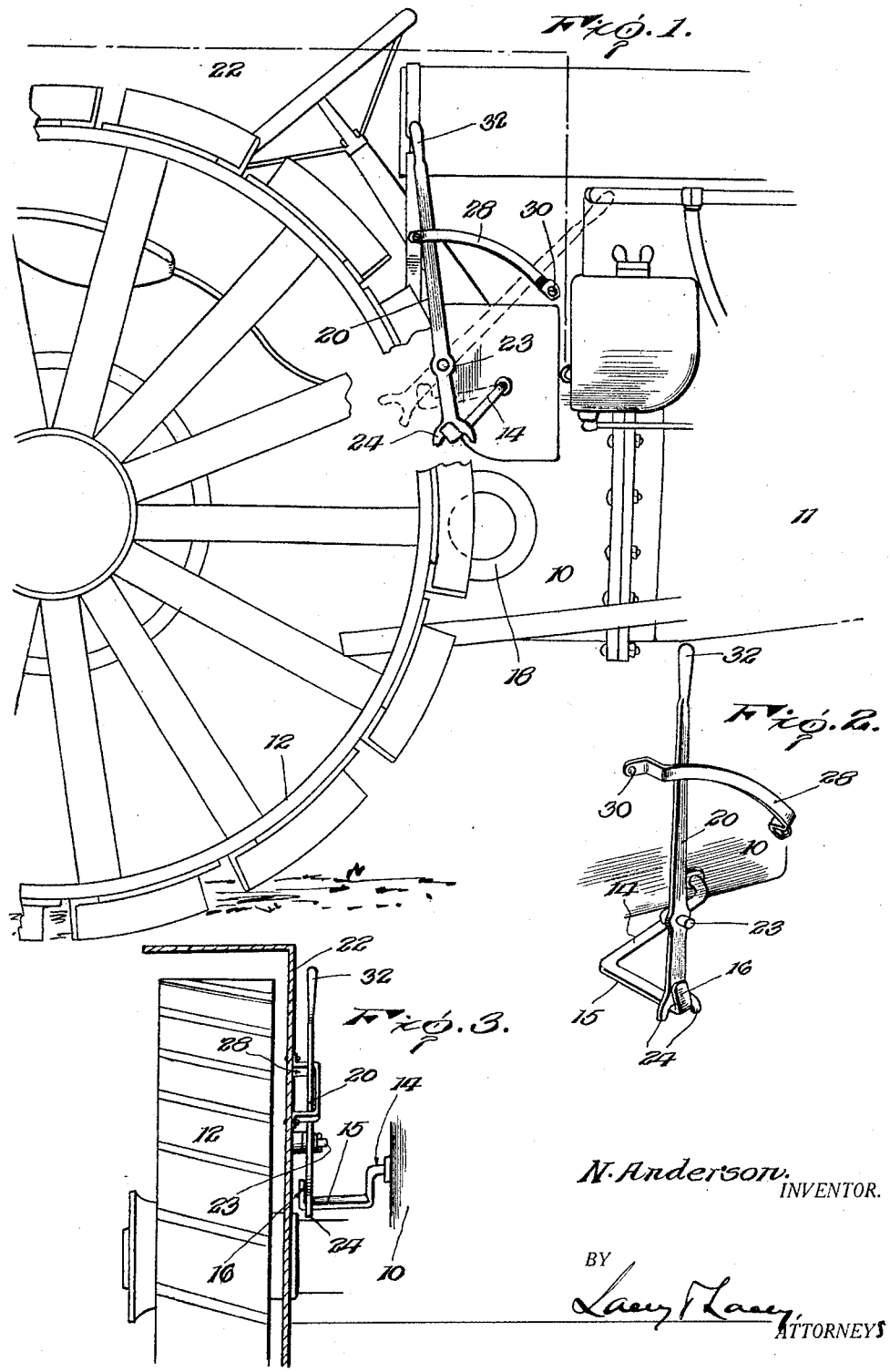
N. Anderson.
INVENTOR.
BY
Lacey & Lacey,
ATTORNEYS

UNITED STATES PATENT OFFICE.

NILS ANDERSON, OF YUTAN, NEBRASKA.

CLUTCH-LOCK.

1,383,278.   Specification of Letters Patent.   Patented July 5, 1921.

Application filed April 17, 1920. Serial No. 374,549.

*To all whom it may concern:*

Be it known that I, NILS ANDERSON, a subject of the King of Sweden, residing at Yutan, in the county of Saunders and State of Nebraska, have invented certain new and useful Improvements in Clutch-Locks, of which the following is a specification.

This invention relates to improvements in clutch locks especially adapted for use on tractors.

An important object of this invention is to provide novel means whereby the clutch of a tractor may be disengaged for releasing the driving connection between the engine of the tractor and the transmission without disengaging the gears of the transmission.

A further object of the invention is to provide a locking device for clutch pedals which may be operated in a highly convenient and efficient manner and which in use does not interfere with the operation of the tractor or impair the efficiency of the same.

A further object of the invention is to provide a device of the class described which may be readily and conveniently applied to a tractor or other vehicle employing the usual power transmitting means without substantially altering the construction of the vehicle.

Other objects and advantages of the invention will be apparent during the course of the following description.

In the accompanying drawing forming a part of this application and in which like numerals are employed to designate like parts throughout the same, Figure 1 is a fragmentary side elevation of a tractor having the improved clutch locking means applied, Fig. 2 is a perspective of the improved clutch locking means detached, Fig. 3 is a detail transverse section through the tractor illustrating the application of the improved clutch lock.

In the drawing wherein for the purpose of illustration is shown a preferred embodiment of the invention, the numeral 10 designates the transmission of a tractor commercially known as the Fordson. As illustrated in Fig. 1, the forward portion of the transmission 10 is connected to the power plant 11 which in this case is in the form of an internal combustion engine and has driving connection with the traction wheels 12 of the tractor through the transmission and the rear axle of the tractor. As is usual in the construction of motor propelled tractors, a clutch of a suitable type is disposed between the engine and the transmission and is provided with a pedal 14 adapted to be depressed by the foot of the operator for releasing the connection between the engine and the transmission. In this case, the clutch pedal 14 is extended out through one side of the transmission housing and is provided with a laterally extending foot engaging portion 15 having its outer portion extended upwardly as indicated at 16. A pulley 18 arranged at one side of the transmission housing is provided with a shaft extended through the housing and having connection with the gears of the transmission so that the power of the engine may be utilized for operating such farm machinery as grain separators. The pulley 18, however, is in the nature of an attachment and is employed only when it is desired to use the power of the engine for other purposes than propelling the tractor. When the clutch of the tractor is depressed, the driving connection between the engine and the pulley is broken so that under ordinary circumstances it is necessary for one to hold one's foot upon the clutch when it is desired to stop the transmission of power from the engine to the grain separator or other machine operated by the engine of the tractor. Also should it be desired to stop the tractor while in motion without disengaging the gears of the transmisson, the clutch must be depressed by the foot and held depressed until it is again desired to set the tractor in motion. If it is desired to release the connection between the engine and the rear wheels or between the engine and the pulley for any length of time, it is naturally inconvenient and tiring for the operator to hold his foot upon the clutch; therefore, this invention aims to provide simple means whereby the clutch may be detachably locked in a depressed position so that the driving connection between the engine and the pulley or between the engine and the rear wheels may be broken for any period of time without the necessity of the operator holding his foot upon the clutch during the entire period of its depression.

The means for locking the clutch in a depressed position comprises the lever 20 pivoted adjacent its lower end to a fender 22 through the medium of a pivot pin 23.

The lower portion of the lever 20 is forked to provide a pair of spaced arms 24 which are adapted to engage opposite sides of the foot engaging portion 15 adjacent the upwardly projecting portion 16 of the same. It will be noted with particular reference to Fig. 2 that the lever 20 is absolutely prevented from pivotal movement when the clutch pedal is engaged between the arms 24. The clutch is therefore effectively locked in a depressed position and accidental movement or disconnection of the lever with the outer portion of the pedal is impossible. As the lever 20 is engaged with the foot engaging portion 15 adjacent the outer end of the same, the foot may be readily engaged with the pedal without interference by the lever. The upper portion of the lever operates inwardly of a segmental retainer and guide 28 having its end portions extended inwardly to form attaching brackets secured to the vertical side of the fender by bolts 30 or other suitable fastening devices. The rear portion of the lever terminates in a handle 32.

The fender clearly illustrated in Fig. 3, may be secured to the tractor by any suitable means and overhangs the adjacent traction wheel so as to prevent splashing of mud from the traction wheel onto the operator. It is therefore apparent that the fender serves the double function of preventing the splashing of mud from the traction wheel and of supporting the segmental rack.

Assuming that the tractor is in motion and that it is desired to bring the same to a stop without disengaging the gears of the transmission, the clutch pedal may be depressed by the foot and engaged by the forked portion of the lever 20. The spring tension of the clutch tends to elevate the laterally extending portion 15 of the clutch pedal and therefore the same is firmly engaged with the forked portion of the lever. With the clutch thus locked in its disengaged position, the tractor may be brought to a halt without the necessity of disengaging the gears of the transmission and when it is desired to again set the tractor in motion the clutch pedal is slightly depressed so as to allow the lever to be moved out of engagement with the adjacent portion of the pedal.

When the clutch pedal is held in a depressed position, the lever 20 is inclined slightly rearwardly and is limited in its rearward movement by engagement with the rear end of the retainer 28. In thus adjusting the lever 20, the tendency of the pedal to move outwardly causes the laterally projecting portion of the pedal to be firmly engaged with the forked arms of the lever so that accidental elevation of the clutch pedal is rendered practically impossible.

Supposing that the pulley attachment of the tractor is connected with a grain separator or other machine, the machine may be stopped when desired by merely locking the clutch pedal in a depressed position. It is therefore unnecessary to stop the engine when it is desired to stop the machine operated by the engine. In this manner the necessity of cranking the engine each time it is desired to start the machine operated by the tractor engine is eliminated.

With reference to the foregoing description and the accompanying drawing it will be noted that the improved locking device may be readily attached to tractors or other motor vehicles without substantially altering the construction of the tractor or vehicle and that the same may be operated with a high degree of efficiency and convenience.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed as new is:

1. The combination with a tractor having a movable clutch pedal provided with a laterally projecting foot-engaging portion, of a lever having its lower portion forked for engagement with an end of the laterally projecting portion of said clutch pedal to hold the clutch released and permit engagement of the pedal by the operator's foot at the side of the lever to permit the clutch to be engaged, and means pivotally supporting the said lever intermediate its ends.

2. The combination with a tractor having a clutch provided with a laterally projecting foot-engaging portion, of a lever pivoted at a point intermediate its ends and having its lower portion forked for engagement with the laterally projecting foot-engaging portion of the clutch pedal, and a segmental retainer arranged adjacent the upper end of said lever and adapted for limiting the movement of said lever.

3. The combination with a tractor having a laterally projecting clutch operating pedal provided with a foot-engaging portion, of a support arranged at one side of the pedal, a lever pivoted intermediate its ends to said support and having its lower portion provided with means for engaging the laterally projecting portion of said clutch pedal, and a retainer carried by said support and adapted for limiting the rearward movement of said lever whereby the lever may be securely engaged with the foot-engaging portion of said clutch pedal.

In testimony whereof I affix my signature.

NILS ANDERSON. [L. S.]